3 Sheets—Sheet 1
R. D. BROWN.
Automatic Grain Binder.
No. 1,875. Reissued Feb. 21, 1865.
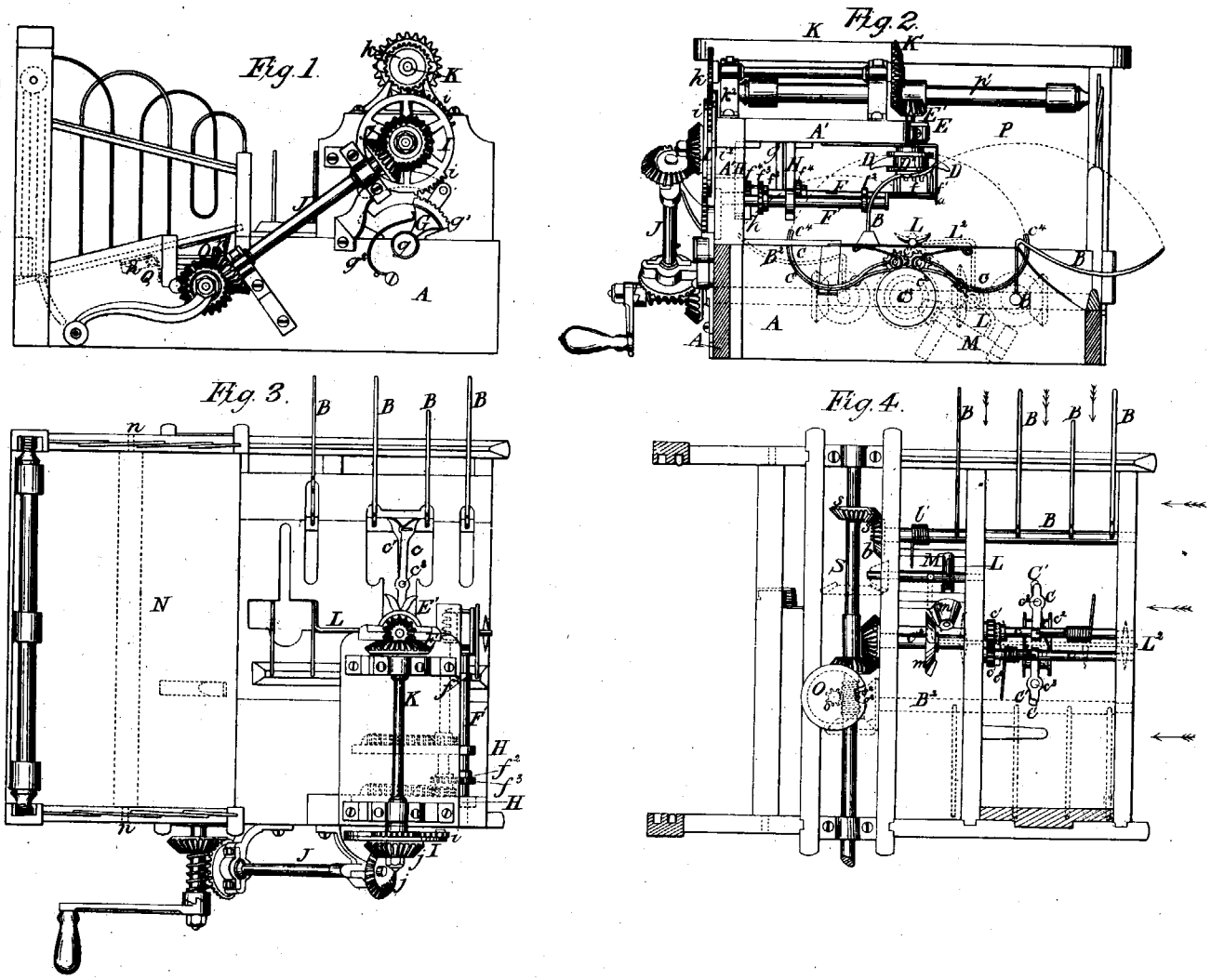
Witnesses:
Charles Smith
James H. Ridley
Inventor:
R. D. Brown
by Munn & Co. Attys.
N. PETERS. Photo-Lithographer, Washington, D. C.

3 Sheets—Sheet 2.

R. D. BROWN.

Automatic Grain Binder.

No. 1,875. Reissued Feb. 21, 1865.

Witnesses:
Chas Smith
Jas Schwitzer

Inventor:
R D Brown
By Munn & Co
Attys

N. PETERS, Photo-Lithographer, Washington, D.C.

3 Sheets—Sheet 3.
R. D. BROWN.
Automatic Grain Binder.
No. 1,875. Reissued Feb. 21, 1865
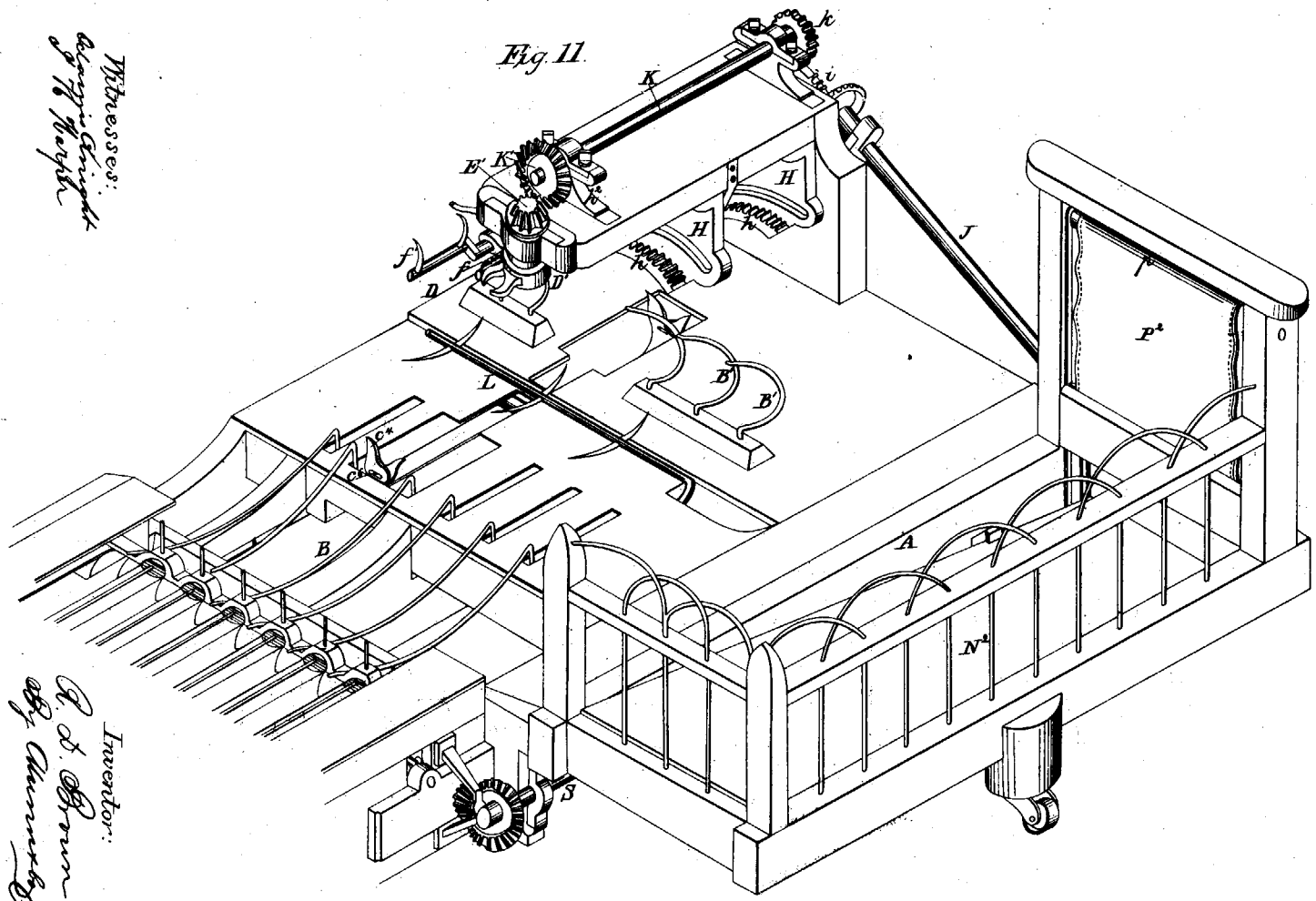
Witnesses:
Calvin Knight
J. H. Harper
Inventor:
R. D. Brown
By Munn & Co
Attys
N. PETERS, Photo-Lithographer, Washington, D. C.

UNITED STATES PATENT OFFICE.

ROBERT D. BROWN, OF COVINGTON, INDIANA.

IMPROVEMENT IN AUTOMATIC GRAIN-BINDERS.

*Specification forming part of Letters Patent No.* 38,093, *dated April* 7, 1863; *reissue No.* 1,875, *dated February* 21, 1865.

*To all whom it may concern:*

Be it known that I, ROBERT D. BROWN, of Covington, in the county of Fountain and State of Indiana, have invented a certain new and useful Machine for Binding Grain; and I do hereby declare the following to be a full and exact description of the same, reference being had to the accompanying drawings, making part of this specification, in which—

Figure 5:
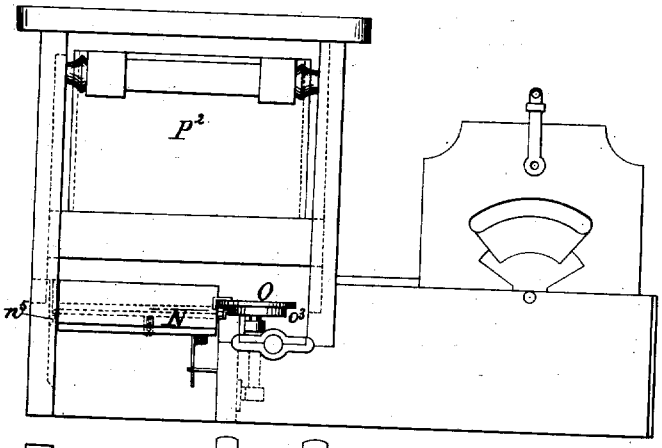
Figure 8:
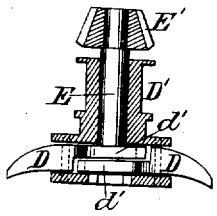
Figure 9:
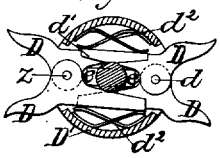
Figure 10:
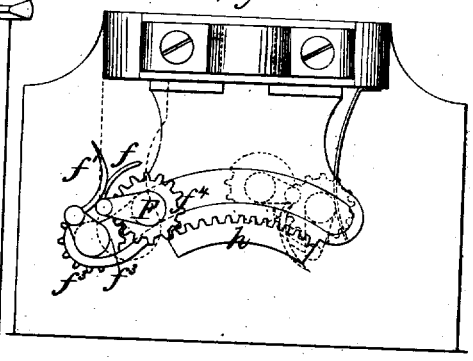
Figure 6:
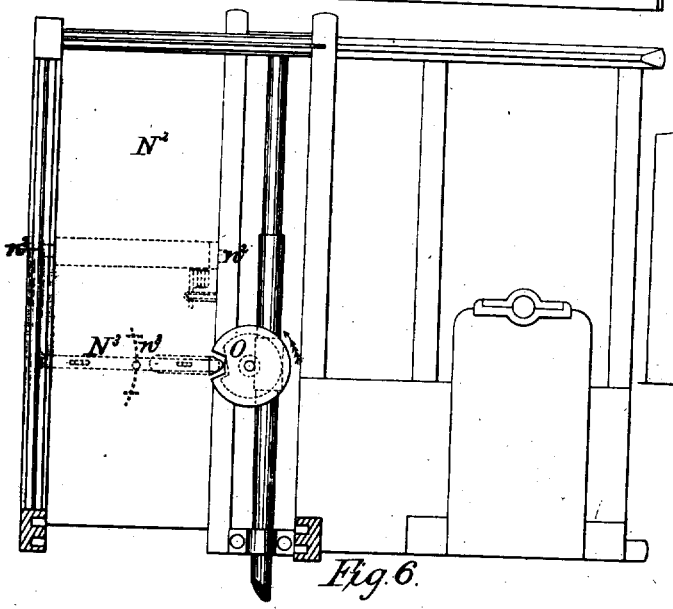
Figure 7:
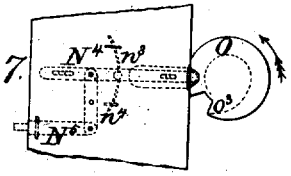

Figure 1 is a side elevation of the apparatus. Fig. 2 is an end view with a part of the frame removed. Fig. 3 is a top view. Fig. 4 is a horizontal section taken immediately beneath the platform. Fig. 5 is a side view, illustrating a different mode of delivering the bound grain. Fig. 6 is a plan, partly in section, representing the form of the machine shown in Fig. 5. Fig. 7 is a fragmentary plan, illustrating a modified form of the device by which the sheaves are deposited. Figs. 8, 9, and 10 are detached views, (on a larger scale,) which will be hereinafter referred to. Fig. 11 is a perspective view of the machine, illustrating its connection with one form of automatic rake, and representing the form of depositing-platform shown in Fig. 5.

Similar letters of reference indicate corresponding parts in the several views.

The subject of my present invention is a machine for automatically binding grain with its own or other straw; and the invention particularly consists, first, in a device for applying the band around the gavel; second, in a device for insuring the correct position of the twisting mechanism to receive the ends of the bands; third, in a device for holding and twisting the ends of the band; fourth, in a peculiar mode of imparting motion to the twisting mechanism, so as to secure its hold upon the band; fifth, in devices for tucking the knot and for holding it against the pressure of the tucking-hand; sixth, in a device for casting the finished sheaves successively onto a common receptacle; seventh, in a peculiar device for depositing the finished sheaves in heaps upon the ground; eighth, in mechanism for counting the sheaves and depositing them in heaps of any desired number.

In order to enable others skilled in the art to which my invention appertains to fully understand and use the same, I will proceed to describe its construction and operation.

A represents the main frame, which may be of any suitable form, and is intended to be attached to or form part of a reaping-machine of any construction, self-raking or otherwise. B is a cradle, in which the grain is deposited by the raker or by the automatic rake. The said cradle is provided at one end of its shaft with a segment-pinion, *b*, (Fig. 4,) by which it receives an intermittent motion at proper periods from a segment-pinion, $s^2$, on the main driving-shaft S′, after which it is held for a limited period by a cam-surface, $s^1$, on the said pinion. $B^1$ are stationary guard-teeth, beneath which the gavel is thrown by the cradle B. *b′* is a spiral spring, by which the said cradle is restored to its normal condition when the pinion is released. C $C^1$ C $C^1$ represent a pair of duplex compressing-arms, in which the gavel is deposited by the cradle B, and which are thrown up at proper intervals by means of pinions $c^1$ upon their shafts *c*, driven by a cogged segment, $c^5$, on the shaft. $c^2$ is a cam-wheel upon the shaft $C^2$, the rotation of which, as the arms C C are raised, turns their pivoted members $C^1$ upon the pivots $C^3$ in such manner as to close the jaws $C^4$ and grasp the ends of a band previously placed therein.

The said jaws are stayed by a pin and slot, $c^6$, permitting them the needful play, but preventing their separation in any other way than edgewise. D D are jaws pivoted, at *d d*, to the lower end of a hollow shaft, D′, which is journaled in the main frame. E is a shaft fitted to turn within the hollow shaft D′, and provided at its upper end with a bevel-pinion, E′, by which it is rotated. At its lower end the shaft E is formed with lateral projections *e*, adapted to bear against arms $d^1$, projecting inward from the jaws D, so that a slight rotation of the shaft E within the hollow shaft D′ will expand the arms $d^1$, and thereby contract the jaws D and cause them to gripe any object which may have been placed between them. Springs $d^2$, bearing inward against the arms $d^1$, restore the jaws to their open or normal position when released. Fig. 8 represents an axial section of the shafts D′ E, with the jaws attached, and Fig. 9, a horizontal section of the same, taken immediately above the jaws. F F′ are a pair of parallel shafts, connected by yokes $f^2$, and geared together by cog-wheels $f^3$, so that rotation imparted to one of the said shafts will be simultaneously communicated to the other in the opposite direction. The shaft F carries a tucking-hand, $f$, formed with serrations or fingers, and the shaft F′ carries a pair of claws, $f^1$, constituting a bearing between which the tucking-hand works.

The shaft F is journaled in the upper end of an arm, G, which is fulcrumed, at $g$, to the main frame. The shafts F F′ are fitted loosely within segmental guides H H, concentric with the fulcrum $g$ of the arm G. To the sides of the said guides are secured toothed racks $h$ $h$, which gear with pinions $f^4$ on the shaft F, so that a rotary motion will be imparted to both the shafts as they traverse the guides H. I is a wheel running upon a stud-shaft secured to the main frame. The said wheel is driven, through the medium of bevel-gearing $j$, from the shaft J, and carries two cogged segments, $i$ $i^1$, secured to its periphery in different planes. The cogged segment $i$ gears with a cog-wheel, $k^1$, on one end of a horizontal shaft, K, on the other end of which shaft is a bevel cog-wheel, $k^1$, which, gearing with the bevel-pinion E′, before referred to, imparts an intermittent rotation to the shaft E, and through it to the jaws D and hollow shaft D′. A spring-stop, $k^2$, (Fig. 2,) engaging in a hole in the wheel $k$ as it is released by the cogs $i^1$, prevents the subsequent displacement of the said wheel, and retains the jaws D in proper position to receive the ends of the band. $i^2$ is a cam on the wheel I, employed to retract the stop $k^2$ when the wheel $k$ is again to be set in motion. The cogged segment $i^1$ gears with a corresponding segment, $g^1$, on the arm G, in order to throw the said arm forward and advance and rotate the shafts F F′, as before explained. Springs $g^2$ $g^3$, of any suitable form, restore the said arm and shafts to their retracted position when released by the segment $i^1$. Fig. 10 shows one of the guides H and an end view of the shafts in their retracted position. Their advanced position is indicated in the same figure.

L is an arm formed with projecting fingers $l$, and attached to a shaft, M, which receives a rotary motion at proper intervals, through the medium of bevel cogged segments $m$ $m'$ on the shaft $C^2$ and M, to throw up the arm L and deposit the bound sheaf upon a table, N.

Lines at $L^2$, in Figs. 2 and 4, represent an arm which may be used as a substitute for the arm L to throw the bound sheaf sidewise instead of backward.

The form of gaveling apparatus which has been described is adapted for use with harvester-rakes which deliver the cut grain in a compact mass at the side or end of the platform. The grain in this case is received at the point indicated by an arrow in Fig. 4. For machines which deliver the grain in a wide swath by rakes having a circular sweep, or for other forms of machines where it may be needful, the stationary guard-teeth $B^1$ are dispensed with and a second cradle is applied, as shown at $B^2$, in Figs. 2 and 4. In this case the grain will be received in the direction indicated by the arrows in Fig. 4. This position of the raking-platform admits of the use of the arm $L^2$ to cast the sheaf sidewise instead of backward, which device is preferable when circumstances admit of its use.

The table N is pivoted at $n$ to the main frame, and supported in the position shown in the drawings by means of a hook, $n^1$, (Fig. 1,) near its front edge, engaging under a revolving disk, O. The disk O receives a rotary motion by means of a worm, $f^2$, on the main driving-shaft S, gearing with a pinion, $o^1$, on the shaft $o$ of the disk O, the parts being so constructed and combined that one revolution will be imparted to the disk O during twelve or any other desired number of complete motions of the binding mechanism. When the disk has completed a revolution, a slot therein, shown at $o^2$, in Fig. 4, releases the hook $n^1$ and permits the rear edges of the table to fall by the gravity of the superincumbent mass of sheaves. Cords $p$ $p$, attached to the rear edge of the table N, and passing around a roller, $p'$, in the upper part of the frame, draw up a curtain, P, as the table N falls, and by these means the sheaves are deposited in dozens upon the ground at the rear of the machine. A spring, Q, restores the table N to its upper position as soon as it is relieved of the weight of the sheaves, and this loosening the cords $p'$ permits the curtain P to fall by its own gravity.

The above-described apparatus will deposit the sheaves in the wake of the machine. If it be desired to deposit them at one side, the mechanism may be employed which is represented in Figs. 5, 6, and 11. In this illustration the curtain $P^2$ is transferred from the back to the side of the machine, and the pivot $n^2$ of the table $N^2$ is placed longitudinally instead of from side to side. A hook, $n^1$, rests upon the slotted disk O, the same as before. $N^3$ is a bolt engaging in an aperture in the frame to support the rear side of the table. The said bolt is retracted by a spring, $n^3$, when the disk O is in position to permit the descent of the table, but at other times is pressed outward by an eccentric or cam, $o^3$, beneath the disk O. A modified form of this device is shown in Fig. 7. The spring-rod $N^4$ is connected by a lever, $n^4$, to a bolt, $N^5$, so that the pressure of the spring $n^3$ will advance the said bolt, and that of the cam or eccentric $o^3$ will retract it. By using this device in connection with an oblique catch, as shown at $n^5$, in Fig. 5, it may be adapted to retain the table instantaneously when thrown up by the spring Q, instead of waiting for the comparatively tardy motion of the slotted disk O or cam $o^3$ to secure it. For this reason the device illustrated in Fig. 7 is preferred in practice, especially where inequalities in the surface of the ground render the motion of the table unsteady.

The table N or $N^2$ while fixed in position for receiving sheaves has an inclination toward its discharging side or end, in order to cause a greater accumulation of sheaves at that part where their weight is to tilt the table, and also to produce such a slope as (with a slight additional tilting) will insure the discharge of the sheaves when the curtain is raised.

In order that it may have the needful strength and rigidity, the standard A, or that part of the main frame which supports the twisting and tucking mechanism, is cast in one piece, together with the bearings and attachments, so far as practicable.

*a* represents a shield covering the faces of the tucker *f* and $f^1$, in order to protect them from becoming clogged with straw.

The operation is as follows: A band of straw s first laid across the arm L, with its ends in the jaws $c^4$. The grain is then deposited automatically or by hand-raking upon the cradle or between it and the guard $B^1$ or secondary cradle $B^2$. The segment-pinions *f b* then elevate the cradle B and cause it to compress the gavel beneath the guard $B^1$, or, in case the double cradle is used, it is compressed between the two cradles. The arms C $C^1$ then carry up the band and deliver its ends within the jaws D. The shaft E then begins to turn, the effect of which is to first close the jaws D tightly upon the ends of the band and then carry them round an entire revolution, or as much more as may be needful. The band being thus twisted, the tucking hand *f* is advanced and rotated simultaneously, tucking the twisted part of the band beneath that part which surrounds the sheaf, the latter being held by the claw $f^1$ to prevent its displacement. The advanced position of the tucker *f* and claw $f^1$ are shown in Fig. 10. Having done their work, the said tucker and claw and the cradle B and arms C $C^1$ are retracted by the action of their respective springs, as already described, and the bound sheaf is thrown by the arm L onto the table N, which deposits on the ground, in the manner already explained, when the required number have been bound.

The front part of the apparatus on which the binding is performed may rest upon or form part of the platform of a reaping-machine of any suitable construction, but the table N, which carries the mass of sheaves, should be supported on one or more independent wheels, to prevent undue or unequal pressure upon the reaping-machine platform.

Having thus described my invention, I wish it distinctly understood that I do not limit myself to the precise arrangement, form of parts, or details herein laid down, but propose to vary the same in any way which experience may prove to be desirable, so long as the essential features of the invention be not departed from.

The following is what I claim as new and desire to secure by Letters Patent:

1. In combination with a cradle, B, of any suitable construction, the arms C $C^1$ attached to shafts *c c*, geared together by wheels $c^1$ and rotated at proper intervals by a cogged segment, $c^5$, to elevate the arms C $C^1$ and carry the band around the compressed gavel.

2. The combination of the cam-wheel $c^2$ with the arms C $C^1$, for securing the band in the jaws $c^4$.

3. In combination with the arms C $C^1$, constructed and operating substantially as herein described, the employment or use of two pairs of griping or twisting jaws, D D, attached by separate pivots *d d* to a common journal, D′, and operating substantially as and for the purpose set forth.

4. Driving the jaws D by the shaft E working within the hollow journal D′, in the manner explained, to compress the said jaws with force corresponding with that required to rotate them.

5. The combination of the spring-stop $k^2$, cam $i^2$, and wheels I and *k*, when the said parts are constructed, arranged, and operated in the manner and for the purposes herein specified.

6. The tucking-hand *f*, advanced and rotated substantially as described, for the purpose of tucking the twisted ends under the band.

7. Holding the band against the pressure of the tucking-hand by means of the claw $f^1$, or its equivalent, substantially as described.

8. The combination and arrangement of the shafts F $F^1$, yokes $f^2$, pinions $f^3$ $f^4$, guides H, and segment-racks *h*, to impart the required motion to the tucker *f* and claw $f^1$, substantially as set forth.

9. The arm G, provided with a cogged segment, $g^1$, and employed to advance the shafts F F′ intermittently, in the manner and for the purposes explained.

10. The segment cog-wheel I *i* $i^1$, constructed as described, in combination with the twisting-jaws D and tucker *f*, or their equivalents.

11. The arm L, or its described equivalent, for casting the sheaf, substantially as explained, when used in the described combination, with the pivoted table N or $N^2$, or other suitable receptacle for carrying the sheaves and depositing them in heaps.

12. The curtain P or $P^2$, operated by the falling and rising of the table N or $N^2$, in manner substantially as and for the purposes set forth.

13. The mode of combining the worm $s^2$ and slotted disk O, or any substantially equivalent devices for counting the number of sheaves to be deposited in each heap, with an automatic binding-machine, substantially as herein described.

14. The combination of the sheaf-holder B B′, or equivalent device, with rotating griping-jaws for twisting the band, and the tucking-hand and holder, as described.

ROBT. D. BROWN.

Witnesses:
EDWARD H. KNIGHT,
ALEXR. A. C. KLAUCKE.